(12) United States Patent
Carlson

(10) Patent No.: US 8,470,946 B1
(45) Date of Patent: Jun. 25, 2013

(54) ENHANCED STRENGTH CARBON NANOTUBE YARNS AND SHEETS USING INFUSED AND BONDED NANO-RESINS

(75) Inventor: Lawrence E. Carlson, Santa Clarita, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 13/590,130

(22) Filed: Aug. 20, 2012

(51) Int. Cl.
*C08F 136/02* (2006.01)
*C08F 132/06* (2006.01)

(52) U.S. Cl.
USPC .............. 526/340.3; 525/326.1; 525/331.9; 525/332.1; 525/332.5; 526/89; 526/280; 526/335; 526/336; 977/778; 977/783; 977/786; 977/788; 977/832; 977/896; 977/897

(58) Field of Classification Search
USPC ........ 525/326.1, 331.9, 332.1, 332.5; 526/89, 526/280, 335, 336; 977/778, 783, 786, 788, 977/832, 896, 897
See application file for complete search history.

(56) References Cited

U.S. PATENT DOCUMENTS

| | | | |
|---|---|---|---|
| 7,045,108 B2 | 5/2006 | Jiang et al. | |
| 7,601,421 B2 | 10/2009 | Khabashesku et al. | |
| 7,988,893 B2 | 8/2011 | Liao et al. | |
| 2008/0063860 A1 | 3/2008 | Song et al. | |
| 2008/0170982 A1* | 7/2008 | Zhang et al. | 423/447.3 |
| 2009/0136751 A1 | 5/2009 | Zhu et al. | |
| 2009/0220409 A1 | 9/2009 | Curliss et al. | |
| 2009/0282802 A1* | 11/2009 | Cooper et al. | 57/238 |
| 2010/0119822 A1 | 5/2010 | Hwang et al. | |
| 2010/0129654 A1 | 5/2010 | Jiang et al. | |
| 2010/0256290 A1 | 10/2010 | Costanzo et al. | |
| 2010/0276072 A1 | 11/2010 | Shah et al. | |
| 2011/0024409 A1* | 2/2011 | Shah et al. | 219/482 |
| 2011/0159270 A9 | 6/2011 | Davis et al. | |
| 2012/0088934 A1 | 4/2012 | Zettl et al. | |

OTHER PUBLICATIONS

Jeong, Chem. Mater. 2008, 20, 7060-7068.*
Ciselli, Materials Technology, 2007, vol. 22, p. 10-21.*
Corey D. Hernandez et al., Towards Multifunctional Characteristics of Embedded Structures with Carbon Nanotube Yarns; Caneus 2006-11023, Proceedings of Caneus 2006 Micro and Non-Technology for Aerospace Applications Toulouse, France Aug. 27- Sep. 1, 2006, 4 pages.

(Continued)

*Primary Examiner* — Robert C Boyle
(74) *Attorney, Agent, or Firm* — Christie, Parker & Hale, LLP

(57) ABSTRACT

Carbon nanotube (CNT) yarns and sheets having enhanced mechanical strength using infused and bonded nano-resins. A CNT yarn or sheet is surface-activated to produce open bonds in the CNT walls prior to resin infusion. The CNT yarn or sheet is infused with a low viscosity nano-resin that penetrates spaces between individual CNTs and is cured to cross-link and chemically bond to the CNT walls, either directly or through a functional molecule, to bond the individual CNTs or ropes to each other. The nano-resin can comprise dicyclopentadiene having an uncured viscosity near that of water. The cross-linking process involves ring-opening metathesis polymerization and catalysis of the nano-resin in combination with a functionalizing material such as norbornene, to enhance bonding between the carbon and nano-resin. The process increases load capability, tensile strength, and elastic modulus of the yarns and sheets, for use as a structural component in composite materials.

26 Claims, 7 Drawing Sheets

OTHER PUBLICATIONS

C-D Tran et al., Manufacturing Polymer/Carbon Nanotube Composite Using a Novel Direct Process; IOP Publishing Nanotechnology 22 (2011) 145302, 9 pages.

Eugenie Samuel Reich; A Neat Trick for Strengthening Carbon Nanotube Yarns; Mar. 21, 2011; Nature.com, 2 pages.

Cheng, Q., et al., Functionalized Carbon-Nanotube Sheet/Bismaleimide Nanocomposites: Mechanical and Electrical Performance Beyond Carbon-Fiber Composites, "Nano Micro Small" 2010, vol. 6, No. 6, pp. 763-767, Wiley InterScience.

Cheng, Q., et al., Long MWNT/Epoxy Nanocomposites: Tailored Functionalization and High Alignment Degree for High-Performance Beyond CFRPS, unpublished (see "Nano Micro Small" article cites et al. #11, p. 767).

* cited by examiner

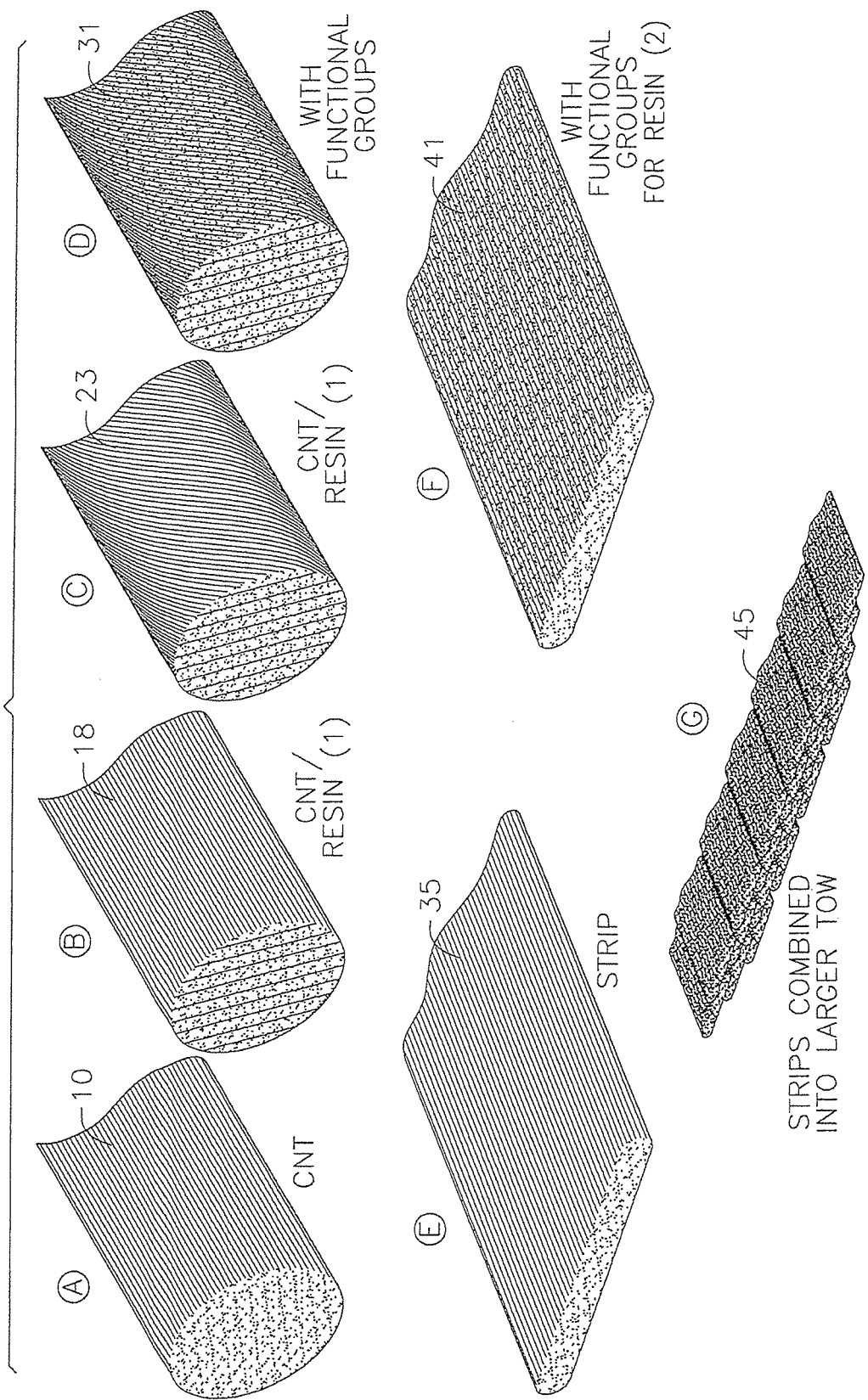

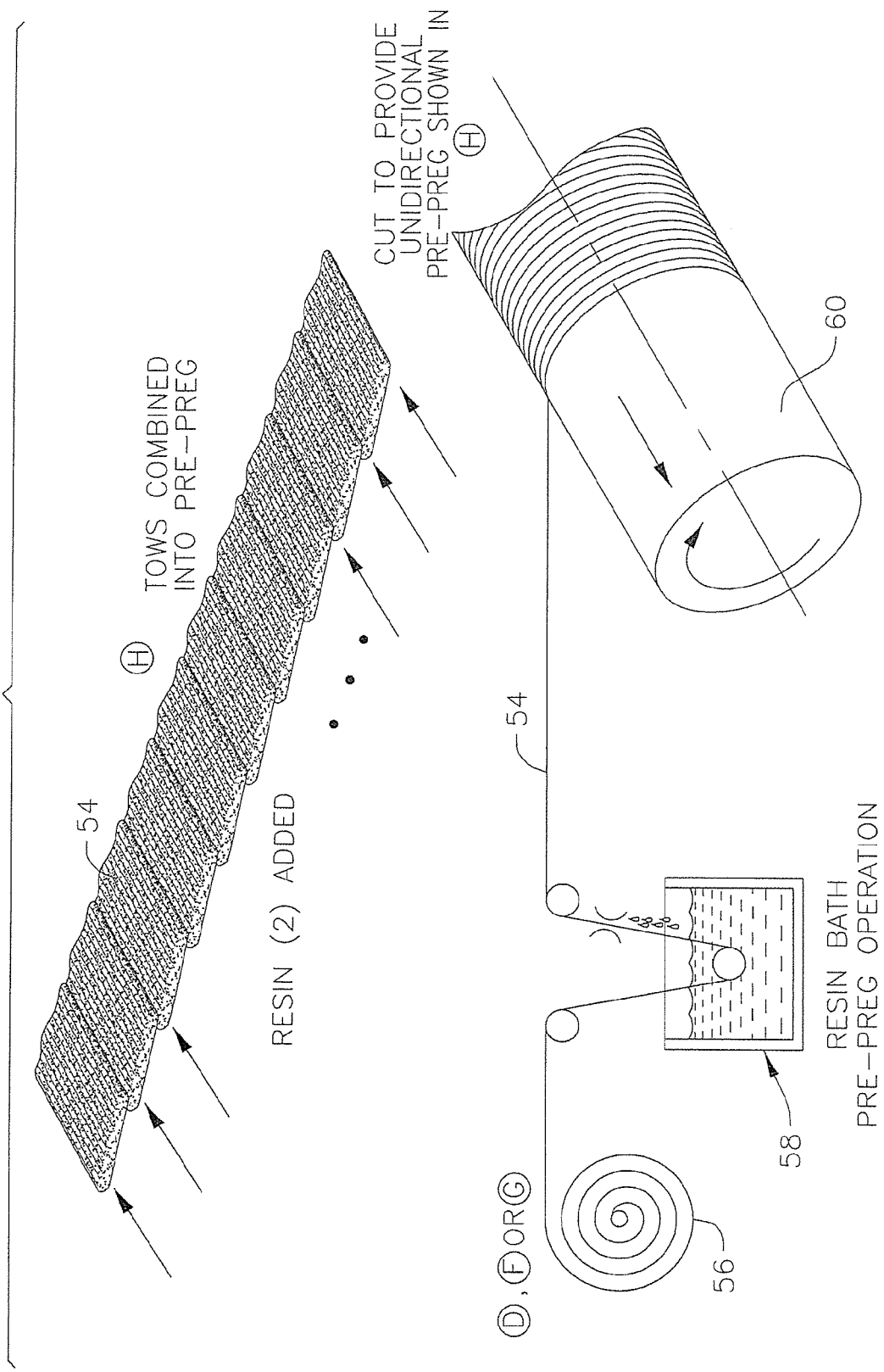

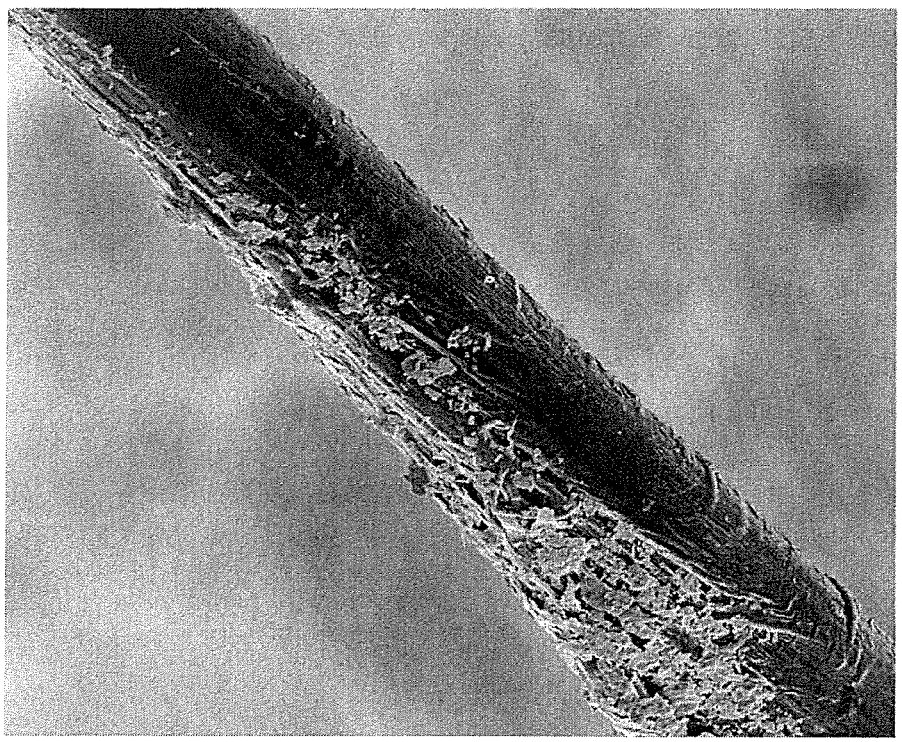
FIG. 4A
FIG.4B
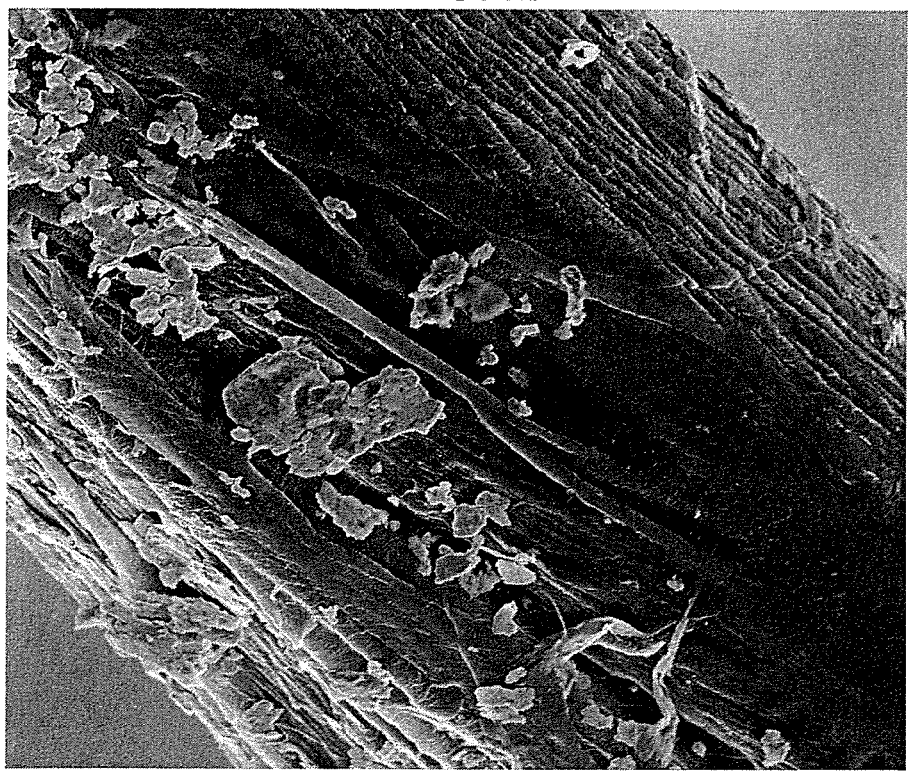

FIG.5A
FIG.5B
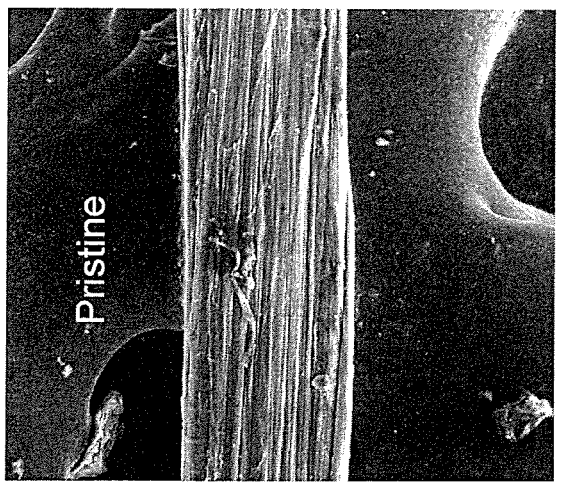
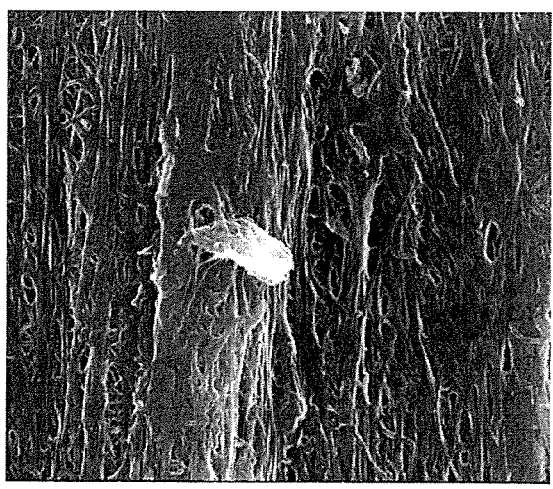
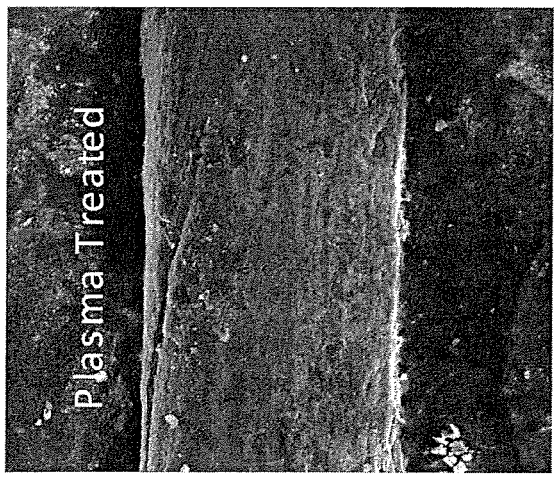
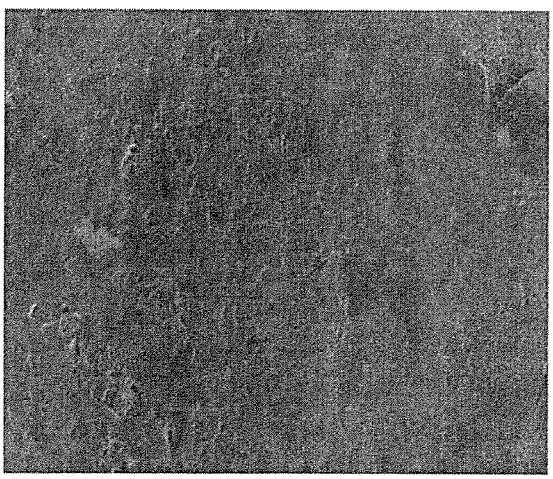
FIG.5C
FIG.5D

ENHANCED STRENGTH CARBON NANOTUBE YARNS AND SHEETS USING INFUSED AND BONDED NANO-RESINS

FIELD OF THE INVENTION

This invention has to do with strength enhancements for carbon nanotube (CNT) yarns and sheets based on the use of infused and bonded nano-resins.

BACKGROUND

Carbon nanotubes are considered to be one of the strongest materials in existence, with individual single-wall tubes demonstrating breaking strengths of about 120 GPa and a Young's modulus of 1 TPa. CNTs used commercially in yarns and sheets have an average theoretical tensile strength for a single CNT of about 25 GPa. This type of nano-scale performance has yet to be duplicated on macro-scale carbon nanotube assemblies, such as composite parts made up predominantly of CNT sheets and yarns.

CNT sheets and yarns are currently being made with promising macro-scale strength properties—breaking strengths of sheets exceeding 1 GPa and yarns approaching 2 GPa. Composites made from CNT sheets have breaking strengths of around 2 GPa, which exceeds the performance of most graphite composites on a bulk basis. In addition, the strain-to-failure is around 10%. (The resin component does not add significant strength properties to the CNTs in the CNT/resin composites.) Thus, CNT material: (1) approaches the strength of Kevlar®—with significantly greater fracture toughness; (2) equals the environmental robustness of graphite; and (3) is far lighter weight than either Kevlar or graphite.

CNTs function best in tension. Real structures suffer from shear and compression failures well ahead of CNT theoretical limits. Analysis reveals signs of van der Waals force failure, indicating a weak link in holding individual nanotubes together. Experiments confirm that CNT yarn failure appears to be excessive pullout/slippage from nanotube ends or flaws, not breakage of an individual nanotube.

The unique mechanical properties of CNTs have led to recent research and development of high performance CNT-polymer composites. Numerous approaches have been taken for utilizing the significant mechanical properties of CNTs to produce enhanced strength composites.

Techniques used in the past include methods for fabricating CNT yarn for improving the strength of the yarns used as the reinforcing material in polymer matricies, or for improving the ways in which CNTs are incorporated into the various polymer materials.

To date, one problem has been scaling up the strength and stiffness of the individual CNT yarns. A growing area of research involves spinning CNTs into flexible higher strength yarns. Since bundles of CNTs tend to slide past each other, owing to the weak van der Waals forces, one prior art process involves CNT yarns strengthened by exposing bundles of CNT fibers to high-energy electron radiation to create covalent bonds between individual nanotubes. [Nature.com/news/ 21 Mar. 2011; "A neat trick for strengthening carbon nanotube yarns"] In another process, an assembly of one or more spun yarns comprising CNTs are chemically interlinked one to another and arranged in spiral configurations in the form of a yarn, thread or fabric used as a reinforcing material in a composite structure. [US 2009/0282802 to Cooper et al.]

Various techniques have been developed for incorporating CNTs into resinous matrix composites to improve mechanical properties. In one process, highly aligned CNTs formed as a yarn are combined with a polymer resin after being stressed through a dry spinning process. The resin is cured and polymerized with the CNT structure acting as a reinforcement in a CNT-polymer composite. [Tran, et al., "Manufacturing Polymer/Carbon Nanotubes Composite Using a Novel Direct Process, *Nanotechnology, vol.* 22, no. 14, 2011]

In another process the CNTs are infused into the base material: a polymer, other carbon fibers, a polymer foam, or other structural material. US 2010/0276072 to Shah, et al. is one example. One prior art approach has been to enhance the physical bonding of the CNTs to the base material of the composite. [US 2001/0159270 to Davis, et al.] Other approaches chemically bond the polymer material, in which the CNTs are embedded, to the outer walls of the CNT material. [US 2010/0119822 to Hwang, et al.]

Some prior art techniques involve infiltration of the CNTs using chemical functionalization of the CNTs, to produce useful CNT-polymer composites. [U.S. Pat. No. 7,601,421 to Khabashesku, et al.] Another process for chemically modifying CNTs is described in US 2010/0256290 to Costanzo, et al.

Thus, the prior art continues to seek improvements in taking advantage of the unique properties of CNTs in order to produce commercial-scale enhanced strength composites.

The present invention provides a process for improving the bonding between individual CNT yarns and sheets that leads to greatly improved macro-scale performance properties of the CNT materials and their composites. One aspect of the invention is based on the recognition that some resins have such high viscosity that infusion pressures are insufficient to penetrate smaller spaces between the CNTs. Some resins have insufficient functional groups that do not provide the "wetting" that enhances penetration into the smallest void spaces. Some resins have molecular structures that are physically too large to penetrate CNT ropes or yarns. And some resins do not provide functional attack throughout the structure, which can undertreat the inner regions of the CNT yarns.

The present invention overcomes these drawbacks by providing a resin infusion process in which CNT yarns and sheets are infused and bonded with a low viscosity nano-resin that has yielded enhanced strength CNT yarns and sheets which are useful as structural components in a variety of composite structures. In accordance with one embodiment of the process provided by the invention, the nano-resin is essentially completely infused into the void spaces between adjacent CNT yarns, to fill the spaces while undergoing a curing process that results in greatly enhanced strength CNT yarns and sheets and the composite materials in which they are used.

SUMMARY OF THE INVENTION

Briefly, one embodiment of the invention comprises a method for making improved strength CNT yarn, in which a CNT yarn is surface-activated to produce open bonds in the CNT walls in preparation for nano-resin infusion. The surface-activated CNT yarn is infused with a nano-resin that penetrates the spaces between the CNTs and cross-links and chemically bonds the nano-resin to the surface-activated CNT walls to physically bond the individual CNT yarns to each other, to yield enhanced strength CNT yarns. In one aspect of the invention, the nano-resin infused in the CNT yarn comprises a dicyclopentadiene (DCPD) material or other similar nano-resin material that is polymerizable and has an uncured viscosity (at room temperature) near that of water.

The yarn used as the starting material is preferably surface-activated by plasma treatment, although other surface activation techniques for producing open bonds can be used.

The method can be carried out by a combination of functionalizing and nano-resin-infusion, in which the CNT yarn is functionalized by norbornene or other functionalizing molecule to enhance chemically bonding with receptors for the infusing nano-resin.

The infusion process causes the nano-resin to permeate all surfaces in the bundle, to provide substantially uniform coverage of the CNTs.

The resin infusion step also can be enhanced by rapidly-pulsing pressurization means for penetrating the nano-resin into the void spaces between the individual CNT walls.

According to one method of practicing the invention, the CNT yarns that have been resin-infused and bonded to one another in a relatively small size or shape are subsequently surface-activated and functionalized to provide open polymer bonds for subsequent infusion with a different infusing polymer in a relatively larger size or shape.

The enhanced strength CNT yarns produced by the process of this invention have yielded substantial improvements in load strength, tensile strength and elastic modulus, together with related improvements in mechanical properties and performance for CNT-polymer composites made from the CNT yarns.

These and other aspects of the invention will be more fully understood by referring to the following detailed description and the accompanying drawings.

BRIEF DESCRIPTION OF THE DRAWINGS

FIG. 2 illustrates a series of intermediate products A through G, referring back to various products developed by carrying out the different embodiments of the process shown in FIG. 1.

FIG. 3 is a schematic diagram illustrating different embodiments of a pre-preg operation.

FIGS. 4A and 4B are scanning electronic microscopy (SEM) photographs of a CNT yarn showing the effects of infusion with a long-chain polymer.

FIGS. 5A-5D are SEM photographs showing the effects of plasma treatment versus the absence of plasma treatment for nano-resin infused and cured CNT yarns.

DETAILED DESCRIPTION

Figure 1:
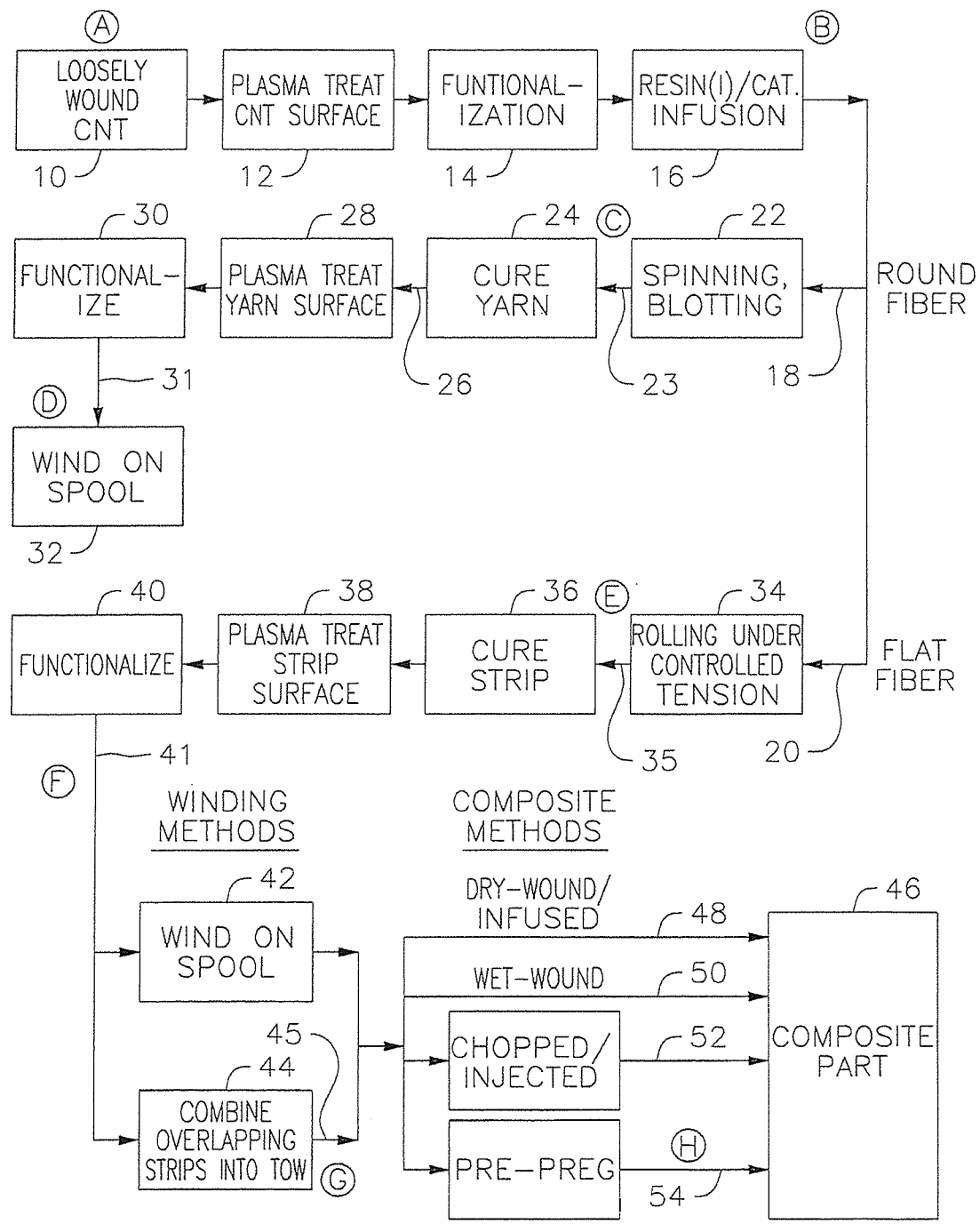
FIG. 1 is a schematic flow diagram showing a progression of steps in a number of alternative processes for carrying out principles of this invention.

The invention comprises a method for making improved strength CNT yarns and sheets. CNT yarn generally comprises an array of carbon nanotubes, typically long, continuous lengths of interlocked or wound CNT fibers suitable for use in production of composite parts. CNT yarn is predominantly composed of single-wall or multi-wall carbon nanotubes. One form of CNTs is unspun yarn—yarn that is only loosely wound, or not at all, generally coming from the furnace or other formation stage. This material generally contains CNT bundles held together by van der Waals forces; and in one embodiment these unspun or loosely wound CNT yarns are used as the starting material. Spun yarns, on the other hand, are yarns that have undergone a separate spinning operation, apart from the formation stage. The yarns used as the starting material in the present invention are preferably the unspun or loosely wound CNT yarns because they are more suitable for subsequent plasma treatment and resin infusion. The covalently bonded but uncured structure is well lubricated compared to others, resulting in more uniform alignment over the section. Alternatively, spun yarns could be used. The CNTs contained in the yarns used as the starting material can comprise single-wall carbon nanotubes or multi-wall carbon nanotubes.

The CNT yarns used as the starting material can be obtained by different processes and chemistry of the carbon sources for making the individual CNTs that form the CNT yarn. Yarns made by chemical vapor deposition would be one example. In one embodiment, the starting material can comprise a continuous yarn of individual CNTs which can be pulled from the furnace as continuous strands of material and deposited on a rotating spool as loosely wound CNT yarn.

In one method of practicing the invention, the CNT yarn or sheet material used as the starting material is initially wound on a spool and unreeled under tension when progressing toward the next step in the process—surface treatment of the CNT yarn or sheet. The CNT yarns are surface-activated to produce open bonds in the CNT walls in preparation for subsequent resin infusion. (As used herein, the term "resin infusion" can mean the process of chemically and physically bonding a plurality of individual unspun or loosely spun CNT yarns to each other via nano-resin treatment as described below.) Surface activation can be carried out by atmospheric pressure plasma (AP plasma) treatment, or alternatively, by hot plasma or hot acid treatment. The presently preferred process involves surface activation by AP plasma treatment. Oxygen plasma treatment would be one example. Surface activation via AP plasma treatment flows ions through the CNTs to create open bonding sites that will strongly cross-link to various infusing nano-resins, described below, without damage to the structural integrity of the CNTs. With a quantity of CNT yarns, the surface activation enhances joining of the carbon and resin between the nanotubes, yielding functional and structural improvements described below.

The surface-activated CNT yarns and/or sheets are infused with a nano-resin that is cured to cross-link and chemically bond to the surface-activated open bond CNT walls, in a polymerization process described below. The nano-resin infusion penetrates or fills the voids between the surface-treated CNTs, along with wetting and curing at their surfaces, while adding covalent bonds that surpass the otherwise weaker van der Waals attraction forces normally present.

A presently preferred nano-resin comprises a dicyclopentadiene (DCPD) material. The DCPD has a chemical formula $C_{10}H_{12}$, although other nano-resins having similar functional properties (described below) may be used. The DCPD nano-resin material is desirable because it is infusible into the extremely small spaces within the CNTs, permeating the voids between the surface-treated CNTs, and locking the CNTs together in the subsequent curing process. The term "DCPD material" as used herein may include an amount of cyclopentadiene (CPD) and may also be referred to as a "CPD/DCPD material." The CPD and DCPD are interchangeable in the sense that CPD ($C_5H_6$) dimerizes or combines to DCPD at room temperatures; and DCPD can be restored to CPD by heating. A natural 10% CPD/90% DCPD mixture is at equilibrium at room temperature, so there is available some amount of the smaller sized CPD to infuse into the smallest of spaces between CNTs. In addition, infusion at elevated temperatures (above 150° C.) can increase the amount of CPD. One improvement provided by use of such a nano-resin involves inhibiting sliding between CNT yarns, to greatly exceed the van der Waals attraction forces that would hold individual CNTs together. The result is improved mechanical strength levels described below.

The nano-resin is infused in the surface-treated CNTs in a wet process, by passing the yarn through a bath containing the nano-resin, or by high pressure infusion in a pressurized chamber. In one embodiment, the surface-treated yarn can be functionalized prior to resin infusion, to add a functional group to the open bonds in the CNT walls, to enhance bonding between the carbon and the infusing nano-resin. The infusion process, in one embodiment, includes contacting the CNTs with a norbornene-containing material and the nano-resin in the same wetting process, in which the norbornene functions as a reagent; or alternatively, the CNTs can be first contacted (functionalized) by the norbornene in a wet process and then infused with the nano-resin and a catalyst in a wet process.

In one embodiment, the nano-resin infusion can be enhanced using a pulsed vacuum-assisted resin transfer molding (VARTM) process. The rapidly alternating vacuum and compression achieves better wetting in the resin infusion process. The resin infusion step also can be carried out by other rapidly-pulsing means such as sonic or ultrasonic vibration.

The resin-infused CNT yarn can next be cured by several alternative processes described below. In one embodiment, the loosely wound, resin-infused CNT yarn is tightly wound and cured directly. In another embodiment the CNT yarn can be processed by mechanically flat-rolling the loosely-wound CNT yarn, followed by resin curing of the flat-wound yarn under tension on a heated roll. Alternatively, the resin-infused yarn can be spun and drawn lengthwise through a die under tension while the fibers are wet, which increases the strength of the yarn, prior to the curing step.

The chemical properties of the nano-resin material are described below with respect to the DCPD material; and the description to follow applies also to CPD/DCPD and other suitable nano-resins. The DCPD nano-resin material or other suitable nano-resins can comprise molecules with a cyclic or stressed ring structure having a ring size that can be within or close to the sub-nm range. The nano-resin preferably comprises a molecular structure that can be readily polymerized by ring-opening metathesis polymerization (ROMP) techniques, described below. The nano-resin molecules generally can have a ringed monomer size of under 100 nm. In one embodiment, the monomer size is under 2 nm, and in another embodiment the monomer size is under 1 nm. In one embodiment, the ring size of the DCPD nano-resin varies from about 0.6 to about 1.5 nm. The DCPD nano-resin, or other suitable nano-resin, has an uncured viscosity (at room temperature) near that of water, for best functionality in terms of infusion into extremely small voids at the molecular level. The infusing nano-resin generally has a low (room temperature) uncured viscosity below about 100 cP. In one embodiment the viscosity is below 50 cP, in another embodiment the viscosity is below 20 cP, and in a further embodiment the viscosity is below 10 cP. The degree of polymerization of the DCPD nano-resin is initially inhibited via controlling the catalyst reaction rate to maintain the resin within a monomer-dimer-trimer state, prior to complete curing. The cured nano-resin has a density of about 1.03 g/cc.

As an example of the curing process, the surface-treated CNT yarns are washed with the norbornene-containing material along with the DCPD infusing resin, and in the process, the norbornene joins with active receptors for the carbon and DCPD on its sides to enhance cross-linking of the resin to the open bonds on the CNT walls.

The polymerization at the surface of the CNTs, as mentioned, is produced by ROMP techniques. Both the DCPD and the norbornene are similar sub-nanometer ring molecules having similar viscosities. In the ROMP process the DCPD is activated by applied heat and a catalyst to carry out the cross-linking process. The preferred catalysts are the Grubbs metathesis family. The curing process is characterized by single bond carbon bonding to the norbornene on one side and the double bond DCPD, in the presence of the catalyst, linking to the norbornene on the other side.

Although the invention has been described with respect to combining the DCPD material or other nano-resin with the norbornene for the polymerization reaction, in an alternative embodiment norbornene can be used as the principal infusing nano-resin, activated by a suitable catalyst in the ROMP process. In other words, the nano-resin can be infused either directly or through a functionalizing molecule.

Thus, the present invention enhances bonding of the CNT yarns with techniques that fully infuse the resin into the void spaces, including: (1) penetrating the resin into the void spaces with fully activated CNT structures throughout, e.g., plasma treatment, together with wetting provided by covalent bonding from the functional groups, and (2) achieving low resistance to infusion with the readily polymerizable nano-resin molecular structure (e.g., the CPD/DCPD) having a low viscosity to enhance flow into all void spaces while being small enough to fit into the small void spaces. And the embodiment which includes the high infusion pressure, pulled with vacuum, in combination with processing steps (1) and (2), provides a "high push-high pull-low resistance" combination that forms a "glue" which effectively reaches all otherwise open void spaces. The result enhances yarn strength by limiting sliding between the CNT yarns.

EXAMPLES

Referring to the drawings, FIG. 1 illustrates several embodiments of the invention in flow diagram form. The processing steps progressing through FIG. 1 produce various intermediate products identified at A through G. Products corresponding to identifiers A through G are illustrated separately in FIG. 2.

Referring to FIG. 1, the starting material for the first step 10 comprises loosely wound (unspun) CNTs which can be provided by a commercial supplier. The CNTs in step 10 (illustrated at A in FIG. 2) are unreeled from a spool on which the loosely wound CNTs are supplied.

The loosely wound yarns of CNTs are next surface-activated at 12 by high energy AP plasma treatment or other desired surface treatment as described previously. According to the AP plasma treatment the gas flows through the yarn so as to open the bonds in the yarn, particularly the weaker C—C bonds.

The surface-treated yarns are next functionalized at 14. The yarn is passed through a liquid bath or spray which, in one embodiment, comprises norbornene as the functionalizing material. The functionalizing step adds a functional molecule to the open bonds to provide the receptors for joining the carbon with the subsequently infused resin (1), described in the next step.

The functionalized yarn is next passed to a bath or pressurized chamber to carry out the resin infusion step 16. The infusing resin, referred to as resin (1), is essentially completely infused into the open spaces between the CNT yarn fibers, as described previously. The infusion step chemically bonds the resin (1) to the functional group. As previously mentioned, a desirable resin is a nano-resin such as the DCPD material having an uncured viscosity similar to that of water. The infusing resin (1) also can comprise a functionalizing resin such as norbornene. In either instance the infusing step is carried out in the presence of a suitable catalyst.

In addition, the resin infusion step 16 can be enhanced by pressurization such as by VARTM techniques or sonification, as described previously. The resin-infused yarn 18 produced from step 16 is illustrated at B in FIG. 2. It comprises a rounded fiber CNT yarn which can then undergo two separate processing alternatives: either as a rounded fiber starting material 18 or as a flattened fiber starting material 20.

The rounded fiber 18 is sent to a spinning and/or blotting machine at 22 which tightens the fibers and forces out excess resin. The resulting resin-infused yarn 23, shown at C in FIG. 2, is next cured at 24 to cross-link the resin (1). The curing step can be carried out under tension on a heated roll. As mentioned previously, the cross-linking process involves ring-opening metathesis polymerization and catalysis of the nano-resin. The curing step can be carried out by oven heating or with radiated energy, for bonding the CNTs to each other to produce the enhanced strength yarns 26 described previously.

The resin-infused and bonded yarn 26 next can be plasma treated at 28 in a manner similar to the surface treatment step 12. The yarn from 26 is surface-treated by the gas flowing around the yarn to open polymer bonds at the surfaces of the yarn. The surface-treated yarn is then functionalized at 30, in a manner similar to the functionalization step 14, to produce a yarn 31 having receptors at the surface for subsequent infusion with a resin (2), described below. The functionalized yarn 31 is wound on a spool 32, as illustrated at D in FIG. 2.

FIG. 1 also illustrates an alternative process of utilizing the rounded-fiber, resin-infused yarn 20 (from the processing step 16) to produce composites as described below. In the alternative process, the CNT yarns that have been resin-infused and bonded to one another in a relatively small size or shape are subsequently surface-activated and functionalized to provide open polymer bonds for subsequent infusion with a different infusing polymer in a larger size or shape.

The alternative process involves making a flattened CNT yarn as a starting material. The rounded fiber at 20 is first sent to a machine for rolling the yarn under controlled tension at 34 to elongate the yarn and produce a flattened yarn 35 with a more consistent cross-section, as illustrated by the strip E in FIG. 2. The rounded fiber 20 can be produced by the resin infusion step 16, with or without the pulsing or pressurization step described previously. The step of rolling the yarn flat under tension consolidates and removes excess resin.

The flattened strip of CNT yarn is next wound on a drum and cured in a curing, cross-linking step 36 similar to processing step 24, where the cured strip would be oven or radiated energy-cured to cross-link the resin (1).

The strip produced by the curing/cross-linking strip 36 is next plasma-treated at the surface in a step 38 similar to the plasma treatment step 28, to produce open polymer bonds in a similar manner.

The plasma-treated flattened strip from processing step 38 is next functionalized at 40 in a manner similar to the functionalizing step 30, to provide receptors at the surface for resin (2) as described previously. The functionalized flat strip of CNT yarn 41 with functional groups for resin (2) is illustrated at F in FIG. 2.

The functionalized and flattened CNT strip 41 produced at 40 can be wound on a spool 42; or alternatively the strips 41 can be combined as overlapping strips at 44 to form a tow 45. In the step of forming a tow, the overlapping strips are illustrated at G in FIG. 2. The strips can be similar in size to a typical carbon-fiber tow. The CNT strips 45 shown at G, as an option, can be impregnated with the resin (2).

The functionalized, flattened strips or tow (from steps 42 or 44) can be integrated into several alternative methods for making enhanced strength composite parts 46. As illustrated in FIG. 1 these include dry-wound/infused CNT yarns 48, wet-wound yarn 50, chopped/injected yarn 52, or a pre-preg at 54.

As illustrated best in FIG. 3, the pre-preg operation involves as a starting material the CNT yarns at D, F or G unreeled from a roll 56 and passed through a resin (2) bath 58. The resin (2) can be any of various known polymeric materials used to make carbon-fiber/resin composites. An epoxy resin can be used as resin (2) for example. The material drawn from the resin (2) bath at 58 forces out excess resin and is wound on a roll of pre-preg 60 which can later be cut to provide unidirectional pre-preg materials, as illustrated at H in FIG. 3.

Improvements provided by the invention include:

(1) The infused nano-resin surrounds the walls of the CNTs to provide sufficient bonding area to exceed the van der Waals attraction forces that hold individual CNTs together.

(2) Sliding between CNT yarns can cause premature failures in tension, shear and compression. The fully infused, chemically bonded CNT walls increase strength levels to avoid such premature failure.

(3) Unspun yarn, post-spun after nano-resin infusion and curing, can greatly increase load and tensile strength and elastic modulus, when compared to CNT yarn or sheets without the treatment described herein. In one embodiment, load strength doubled from 0.75 N to 1.55 N, tensile strength increased 60% from 560 MPa to 900 MPa, and elastic modulus, increased 82% from 33 GPa to 62 GPa.

(4) Greatly increased mechanical strength of SWNT (single-wall nanotube) and MWNT (multi-wall nanotube) yarn is achieved.

(5) Compressive load increases due to the improved lateral support from the cured infused and bonded nano-resin.

Microscopic Analyses

FIGS. 4A and 4B are scanning electronic microscopy (SEM) photographs of a CNT yarn showing the effects of infusion with a long-chain polymer. In FIG. 4A the SEM magnification is 500× and in FIG. 4B the SEM magnification is 2000×. These images illustrate the effect of long-chain polymers used in the prior art, demonstrating how they do not penetrate the yarn sufficiently, with the resin mostly laying on the surface of the yarn.

FIGS. 5A-5D are SEM photographs showing the effects of plasma treatment compared to the absence of plasma treatment for nano-resin infused and cured CNT yarns. Two yarn samples were cut from the same roll. Plasma treatment was not performed on the first sample. Plasma treatment was performed on the second sample, using oxygen plasma for 300 sec at 125W with approximately 1 mm working distance. FIGS. 5A and 5B show the sample 1 yarn at 650× and at 35010×. FIGS. 5C and 5D show the sample 2 yarn at 2500× and at 65023×. The images show that the plasma-treated sample had better coverage and adhesion and that pores in the sample 2 yarn were filled to a significantly greater extent (FIG. 5D) than yarn sample 1 (FIG. 5B).

Figure 6A:
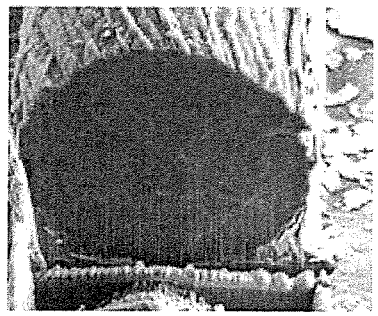
FIGS. 6A-6D are SEM photographs showing comparisons of a CNT yarn before infusion and the same CNT yarn fully infused.
Figure 6B:
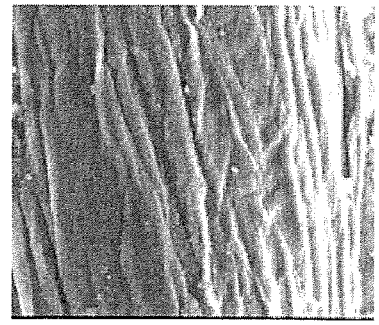
Figure 6C:
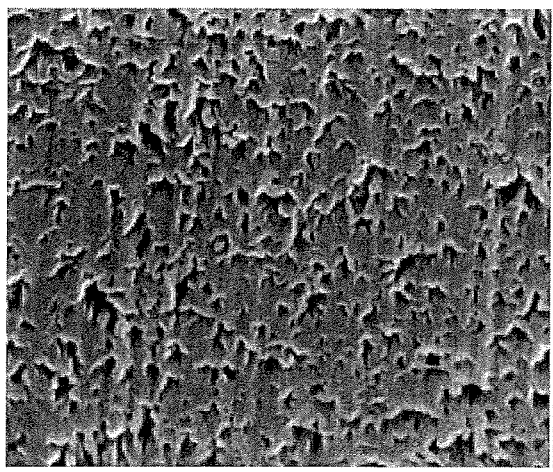
Figure 6D:
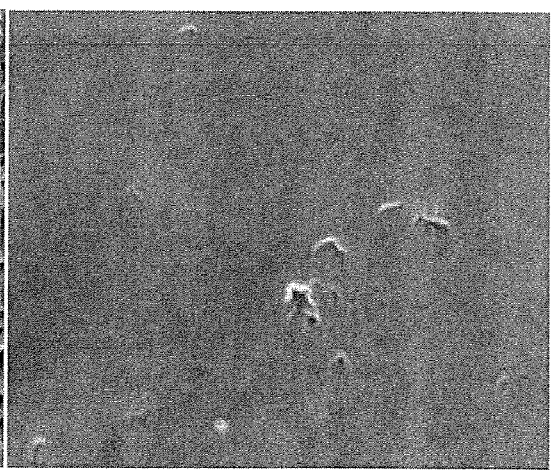

FIGS. 6A-6D are SEM photographs showing comparisons of a CNT yarn before infusion and fully infused. FIG. 6A shows a cross-section of a CNT yarn from focused ion beam (FIB)-SEM imaging. FIG. 6B shows a close-up image of the surface of the yarn sample. FIG. 6C is a close-up from 400 nm showing the yarn before resin infusion. FIG. 6D shows a close-up from 400 nm of the yarn fully infused. The SEM magnification in FIG. 6C is 200,000× as is the fully infused sample shown in FIG. 6D.

Figure 7A:
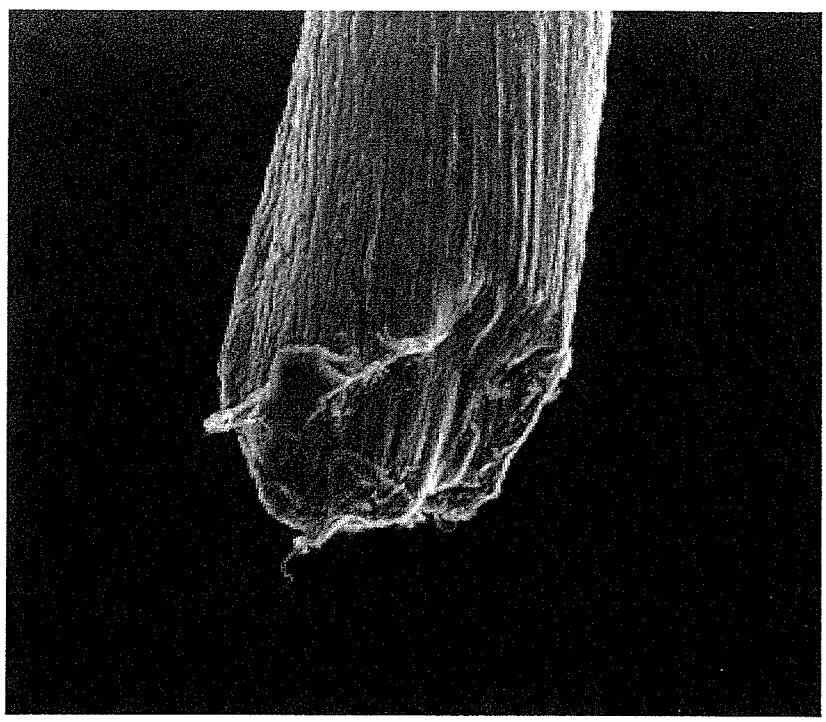
FIGS. 7A-7C are SEM photographs showing bonding comparisons between a CNT yarn infused with a nano-resin according to this invention versus a CNT yarn infused with a different resin having a lesser capability of bonding with the CNT surfaces.
Figure 7B:
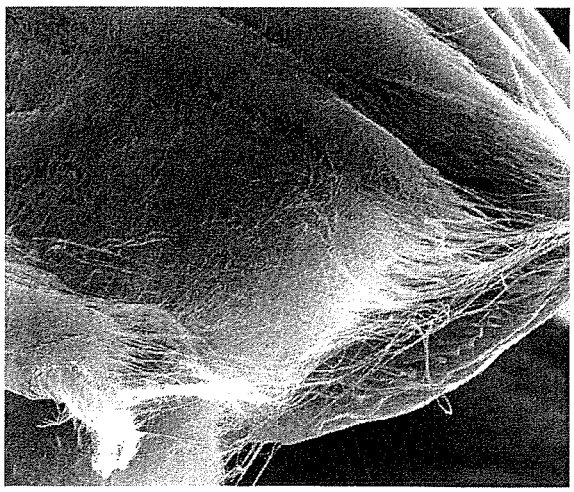
Figure 7C:
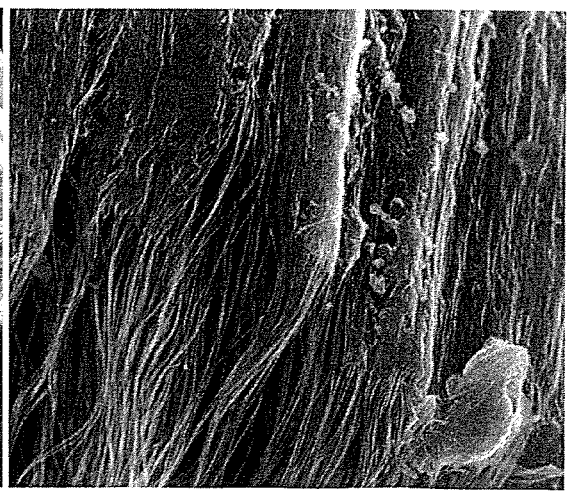

FIGS. 7A-7C are SEM photographs showing bonding comparisons between a CNT yarn sample infused with a nano-resin according to the present invention and a yarn sample infused with a different resin having a lesser capability of bonding the CNT surfaces. FIG. 7A is a close-up taken from 50 micrometers with a magnification of 2000× showing the resin of the present invention having bonded well to the CNTs with little resin fiber pullout. FIGS. 7B and 7C show images of the same yarn sample having been infused with a different resin that lacks good bonding with the CNT surfaces. FIG. 7B is taken from four micrometers with a magnification of 10,000× and FIG. 7C is a close-up taken from three micrometers with a magnification of 30,000×. FIGS. 7B and 7C show the CNT surfaces causing significant pullout and leaving the resin mass behind.

The invention is useful for producing mechanical performance enhancements in a variety of macro-scale CNT assemblies: composite parts made from the CNT yarns and sheets described herein. As an example, several unidirectional sheets or tows, preferably laid up at different angles according to the design stresses, can be used in making such composite parts. For instance, a tow would comprise a relatively large number of unidirectional fibers, generally flat. It would be produced by laying up several flattened yarns edge-to-edge or with an overlap. The length is continuous, as compared to CNT sheet, which is not.

The invention, including infused yarns, sheets or tows, can be used in producing performance enhancements in various commercial products, without limitation. Examples include sporting goods (bats, arrows, hockey sticks, golf shafts and heads), aerospace products (struts, cowls, optic mounts, fuselage, solar sails, antennas and drone structures), and armor (SAPI plates and vehicle armor).

The invention claimed is:

1. A method for making an improved strength CNT yarn, comprising utilizing as a starting material an unspun CNT yarn comprising continuous strands of CNT fibers held together and capable of being drawn under tension through a continuous strength-enhancing process, comprising:
   (1) surface-activating the unspun CNT yarn via atmospheric pressure plasma to produce open bonds in the CNT walls contained in the yarn, in preparation for nano-resin infusion,
   (2) infusing the surface-activated CNT yarn with a nano-resin that penetrates the void spaces between the individual CNTs contained in the unspun yarn,
   (3) tightening the CNT fibers contained in the resin-infused yarn via spinning the yarn under tension or applying pressure to consolidate the yarn under tension, and
   (4) curing the yarn from step (3) to cross-link and chemically bond the nano-resin to the surface-activated CNT walls to physically bond the individual CNTs to each other, to yield an enhanced strength CNT yarn,
   wherein the nano-resin infused in the CNT yarn comprises a DCPD material, CPD/DCPD material, or other similar nano-resin material that is polymerizable and has an uncured viscosity (at room temperature) near that of water.

2. The method according to claim 1 in which the infused nano-resin is polymerized by a ROMP process.

3. The method according to claim 1 in which the CNT yarn is functionalized by norbornene or other functionalizing molecule to enhance bonding with receptors for the infusing nano-resin.

4. The method according to claim 1 in which the infusing nano-resin comprises norbornene.

5. The method according to claim 1 in which an array of the CNT yarns that have been resin-infused and bonded to one another are subsequently surface-activated and functionalized to provide open polymer bonds for subsequent infusion with a different infusing polymer.

6. The method according to claim 1 in which the enhanced strength yarn is characterized by one of (a)-(c):
   (a) a load strength of at least 1.55N;
   (b) a tensile strength of at least 900 MPa;
   (c) an elastic modulus of at least 62 GPa.

7. The method for making an improved strength CNT yarn, comprising:
   (1) surface-activating a CNT yarn to produce open bonds in the CNT walls contained in the yarn, in preparation for nano-resin infusion, and
   (2) infusing the surface-activated CNT yarn with a nano-resin that penetrates the void spaces between the individual CNTs and cross-links and chemically bonds the nano-resin to the surface-activated CNT walls to physically bond the individual CNTs to each other, to yield an enhanced strength CNT yarn,
   wherein the nano-resin infused in the CNT yarn comprises a DCPD material, CPD/DCPD material, or other similar nano-resin material that is polymerizable and has an uncured viscosity (at room temperature) near that of water,
   and in which the enhanced strength yarn is characterized by one of (a)-(c):
   (a) a load strength of at least 1.55N;
   (b) a tensile strength of at least 900 MPa;
   (c) an elastic modulus of at least 62 GPa.

8. The method according to claim 7 in which the infusing nano-resin has an uncured viscosity below 100 cP.

9. The method according to claim 7 in which the surface-activated yarn is atmospheric pressure plasma-treated.

10. The method according to claim 7 in which the nano-resin molecules have a ringed monomer size under 100 nm.

11. The method according to claim 7 in which the resin-infused yarn is post-twisted, prior to curing, by spinning and pulling it through a die under tension to enhance load and tensile strength.

12. The method according to claim 7 in which the infusing nano-resin has a ringed monomer size from about 0.6 to about 2 nm.

13. The method according to claim 7 in which the CNT yarn is infused with the DCPD or CPD/DCPD material and/or norbornene in a wet process in combination with pulsing means to penetrate the voids between the individual CNT walls of the yarn.

14. The method according to claim 7 in which the infusion step is carried out with pulsed VARTM, sonic, or ultrasonic vibration techniques, to penetrate the nano-resin into the void spaces between the CNTs that form the yarn.

15. The method according to claim 7 in which the resin-infused yarn is mechanically flat-rolled, and in which the yarn is infused in its flat form followed by curing under tension on a heated roll.

16. The method according to claim 7 wherein the infusion step is carried out at a temperature above 150° C. to increase the amount of the smaller CPD.

17. The method for making improved strength CNT yarns according to claim 7, comprising:
surface-activating the CNT yarn via plasma treatment to produce open bonds in the CNT walls in preparation for resin infusion, and
in which the infusion step includes cross-linking of the carbon and the nano-resin in the presence of a norbornene-containing material or other functionalizing molecule in combination with ring-opening metathesis polymerization of the nano-resin.

18. The method according to claim 17 in which the infusion step is carried out with pulsed VARTM, sonic, or ultrasonic vibration techniques, to penetrate the nano-resin into the void spaces between the CNTs.

19. The method according to claim 7 in which the starting material comprises an unspun CNT yarn which is resin-infused followed by tightening the CNT fibers in the yarn by spinning or applying consolidating pressure under tension, followed by curing the resin to bond the CNTs to each other.

20. The method according to claim 7 in which the CNT yarns that have been resin-infused and bonded to one another are subsequently surface-activated and functionalized to provide open polymer bonds as receptors for subsequent infusion with a different infusing polymer; and including the step of subsequent infusion with a different infusing polymer for bonding to the receptors provided by the open polymer bonds.

21. The method according to claim 7 in which the CNT yarn is functionalized by norbornene or other functionalizing molecule to enhance bonding with receptors for the infusing nano-resin.

22. The method according to claim 7 in which the CNT fibers contained in the resin-infused yarn are consolidated under tension and/or applied pressure prior to curing the resin to bond the CNTs to each other.

23. An improved CNT yarn which has been plasma-activated to produce open bonds in the CNT walls contained in the yarn and which has been infused with a nano-resin that penetrates the open spaces between the individual CNTs of the yarn and cross-links and chemically bonds to the CNT walls, in combination with functionalizing with a norbornene-containing material or other functionalizing molecule, to physically bond the individual CNT yarns to each other, in which the nano-resin infused in the CNT yarn material comprises a DCPD material, a CPD/DCPD material, or other similar nano-resin material having an uncured viscosity (at room temperature) near that of water, and in which the enhanced strength yarn is characterized by one of (a)-(c):
(a) a load strength of at least 1.55N;
(b) a tensile strength of at least 900 MPa;
(c) an elastic modulus of at least 62 GPa.

24. The CNT yarn according to claim 23 in which an array of the infused and bonded CNT yarns are formed as a tow useful as a structural component in a CNT-polymer composite structure.

25. The CNT yarn according to claim 23 in which an array of the resin-infused and bonded CNT yarns have been surface-treated by plasma and functionalized to provide open bonds adapted for infusion with a different infusing polymer.

26. The CNT yarn according to claim 23 in which the resin-infused yarn has been tightened by spinning or applying consolidating pressure prior to curing the resin to bond the CNTs to each other.

* * * * *